Figure 1:
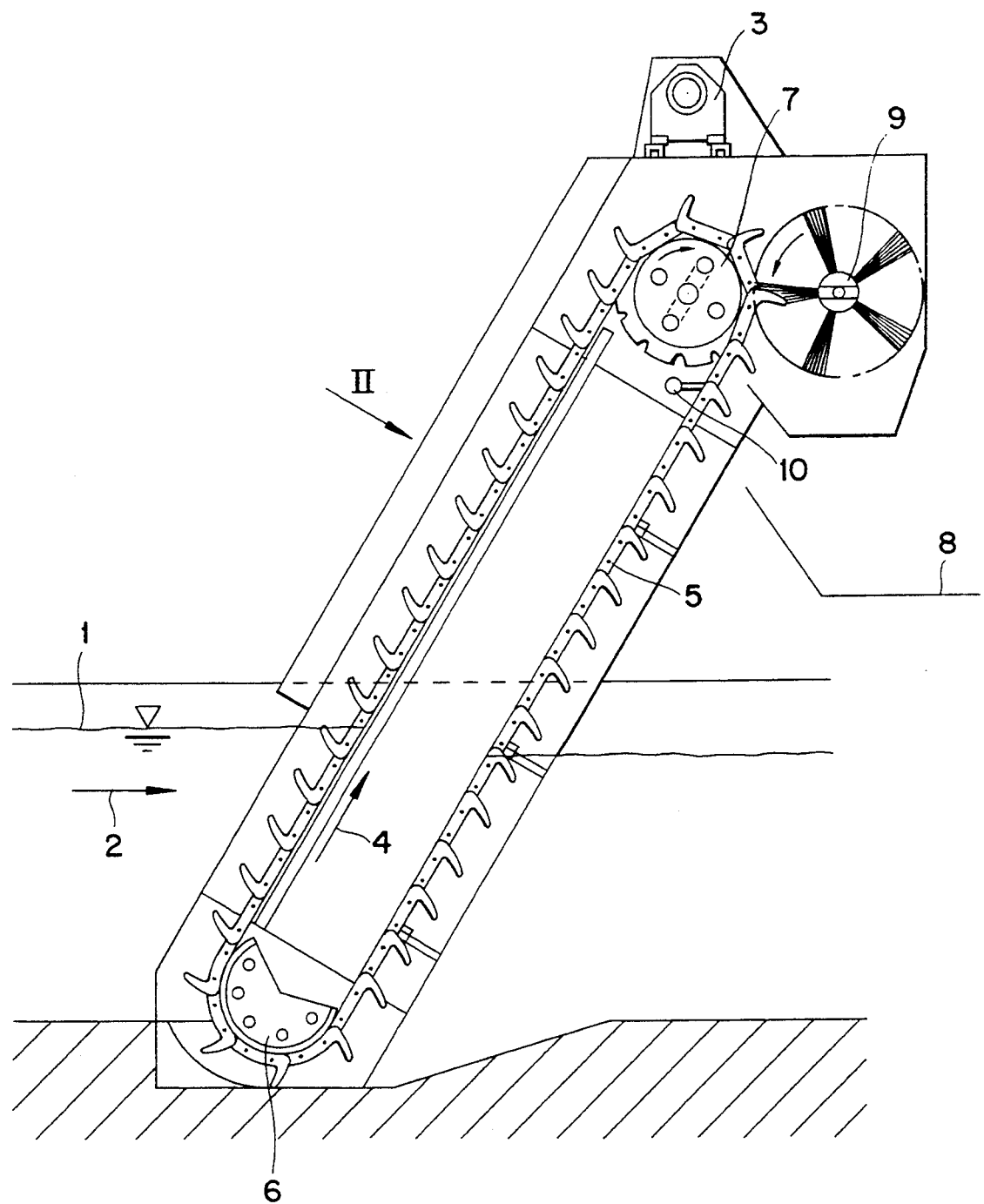

United States Patent
Bormet et al.

[11] Patent Number: 5,387,336
[45] Date of Patent: Feb. 7, 1995

[54] SCREENING RAKE

[75] Inventors: Horst Bormet, Mittelstr. 8, D-6108 Weiterstadt; Erich Fink, Dieburg, both of Germany

[73] Assignee: Horst Bormet, Weiterstadt, Germany

[21] Appl. No.: 129,124

[22] PCT Filed: Jan. 29, 1992

[86] PCT No.: PCT/EP92/00186
§ 371 Date: Oct. 8, 1993
§ 102(e) Date: Oct. 8, 1993

[87] PCT Pub. No.: WO92/18221
PCT Pub. Date: Oct. 29, 1992

[30] Foreign Application Priority Data

Apr. 13, 1991 [DE] Germany .............................. 9104551

[51] Int. Cl.⁶ .............................................. B01D 33/04
[52] U.S. Cl. ...................................... 210/158; 210/160; 210/400
[58] Field of Search ............... 210/158, 159, 160, 391, 210/400

[56] References Cited

U.S. PATENT DOCUMENTS

| | | | |
|---|---|---|---|
| 1,207,376 | 12/1916 | Davidson | 210/160 |
| 2,307,601 | 1/1943 | Nichols | 210/160 |
| 3,856,628 | 12/1974 | Hagihurn | 210/160 |
| 4,188,294 | 2/1980 | Hagihurn | 210/400 |
| 4,597,864 | 7/1986 | Wiesemann | 210/400 |
| 5,060,872 | 10/1991 | Chambers, Sr. | 210/160 |
| 5,102,536 | 4/1992 | Wiesemann | 210/400 |

FOREIGN PATENT DOCUMENTS

| | | |
|---|---|---|
| 389816 | 10/1990 | European Pat. Off. |
| 2401956 | 7/1975 | Germany |
| 2045834 | 11/1980 | United Kingdom |

Primary Examiner—Christopher Upton
Attorney, Agent, or Firm—Burns, Doane, Swecker & Mathis

[57] ABSTRACT

The invention concerns a screening rake for removing solids from flowing sewage, the rake having a driven screening belt which can be immersed in the sewage and which has two lateral chains. A group of screening elements fitted with hooks is mounted on each of two support rods independently of the preceding and following group of screening elements. The screening elements in each group have extension pieces which project beyond the two associated support rods in the direction of travel of the screening belt and in the opposite direction. The extension pieces of successive groups of screening elements engage with each other like the teeth of a comb.

5 Claims, 3 Drawing Sheets

SCREENING RAKE

The invention relates to a sieve rake for the removal of solid matter from a waste water current, with a driven sieve belt that can be immersed in the waste water current and that exhibits two lateral link chains, extending between which are support bars which support groups of filter members positioned in succession and provided with hooks.

Waste water must be mechanically purified of solid matter that is larger than a predetermined particle size, before being treated in clarification plants. Here the prior art is familiar with the process of conducting a waste water current through a sieve rake which retains the solid matter. Removal of the solid matter is necessary at regular intervals or continuously in order to avoid stoppage of the sieve rake.

Sieve and filter rakes that meet this end are known in various designs. The sieve rake usually exhibits a continuously drive sieve belt of the paternoster type, that consists of individual sieve members whose interstices form the sieve area through which the waste water flows.

Usually the sieve members, or at least several of the sieve members that compose the sieve belt, are furnished with hooks, tiers, or other projections which serve to capture the deposited solid matter, particularly bodies of larger size, and to remove it from the waste water current. The solid matter is disposed of at the head of the sieve belt onto a removal device. A rotating brush can be provided to remove adhesive material.

Given the very different characteristics of the solid matter that accumulates, including large and solid bodies, damage to the sieve member, particularly to the attached hooks, is unavoidable. Sieve members thus damaged must be replaced.

In sieve rakes of the indicated type known to the prior art (company publication SK Technical Bulletin 120 "AQUA-GUARD") each of the sieve members furnished with a hook is supported by two support rods. However, these sieve members are positioned in stacked fashion such that all support rods are connected to each of the two adjacent support rods by way of several sieve members jointly supported by these rods. The replacement of damaged sieve members is therefore relatively involved and demands a longer interruption in operation, since in detaching two support rods it is necessary not merely to remove the sieve members supported jointly by these support rods, but also to partially detach sieve members extending to the adjacent support rods. Thus the sieve belt can only be returned to operation after the complete replacement of the damaged sieve members.

In another sieve rake design known to the prior art (DE-A-39 10 464) all adjacent sieve members belonging to a single group are supported only by two joint support rods. The connection to the given adjacent support rods occurs exclusively by means of connecting members that are not furnished with hooks. However, lateral link chains are not provided, so that when damaged sieve members are replaced this screening belt must also be removed from operation until all damaged screening members are replaced.

A longer interruption in operation is not normally possible for such sieve rakes, however, since solid matter accumulating on the sieve belt would constrain the belt, with the result that the current resistance would increase considerably and the waste water current would be unacceptably retarded. As a result, it is necessary either to permit the removal from operation of the sieve rake in need of repair by the parallel positioning of one or several other sieve rakes, or to remove the sieve rake from the waste water channel and replace it during the repair period by a reserve sieve rake, for example, a simple sieve rake that can be cleaned manually. All of these measures are complicated and expensive, however.

Thus the problem addressed by the invention is to elaborate a sieve rake of the initially described type in such a way that it remains functional after the failure of individual sieve members or entire groups of sieve members and after their removal, to thereby either totally eliminate interruptions in operation or at least reduce them to a very brief interval.

This problem is solved by the invention in that each group of sieve members is positioned on two support rods independent of the preceding and following group of sieve members.

This design makes it possible to completely dismantle a group of sieve members that are partly damaged, while the corresponding two support rods are either employed without sieve members or are replaced with bolts for the link chains. After this dismantling of a group of sieve members, which can be performed in a brief period of time and without interruption in operation, the sieve belt can remain in operation. After removal of the group of sieve members the point that permits the unimpeded flow of the waste water can be traversed by running the sieve at high speed through the waste water current, so that immediately afterwards a completely functional area of the sieve belt comes into action.

According to a preferred embodiment of the inventive concept, the sieve members of each group exhibit extensions that protrude above the two corresponding support rods both in the belt's direction of motion and in the opposite direction, and the extensions of successive groups of sieve members interlock in a comb-like fashion.

This results in the distance between adjacent groups of sieve members being bridged with particularly success, without there being a functional dependence between adjacent groups of sieve members that could impede or disrupt the dismantling of individual groups.

Further advantageous embodiments of the inventive concept are the subject matter of other secondary claims.

Figure 2:
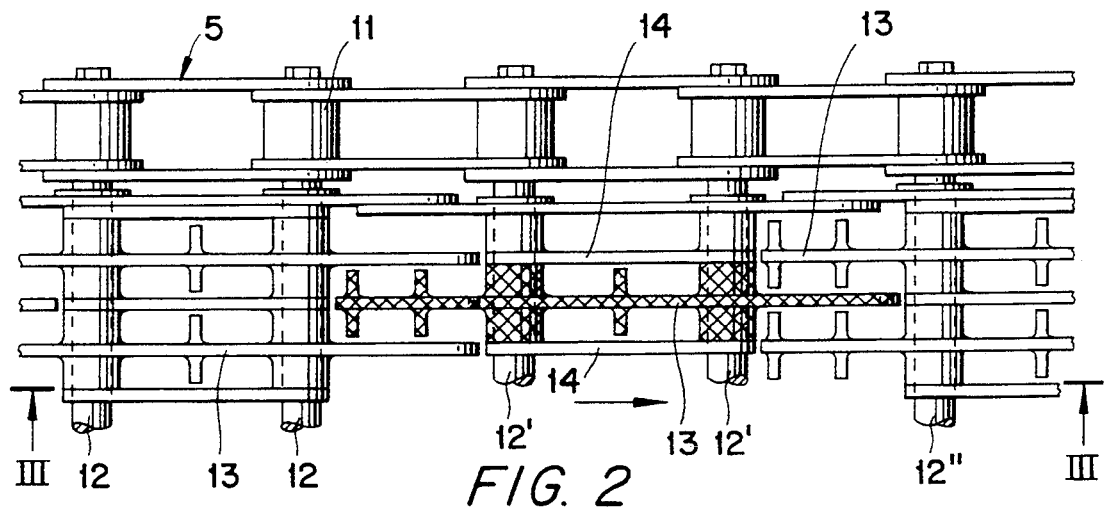

The invention will now be described in greater detail on the basis of embodiment examples that are shown in the drawing. Shown are:

FIG. 1 simplified depiction of a sieve rake positioned in a waste water current, in vertical section FIG. 2 a partial top view of the sieve belt of the sieve rake in the direction of arrow II shown in FIG. 1

Figure 3:
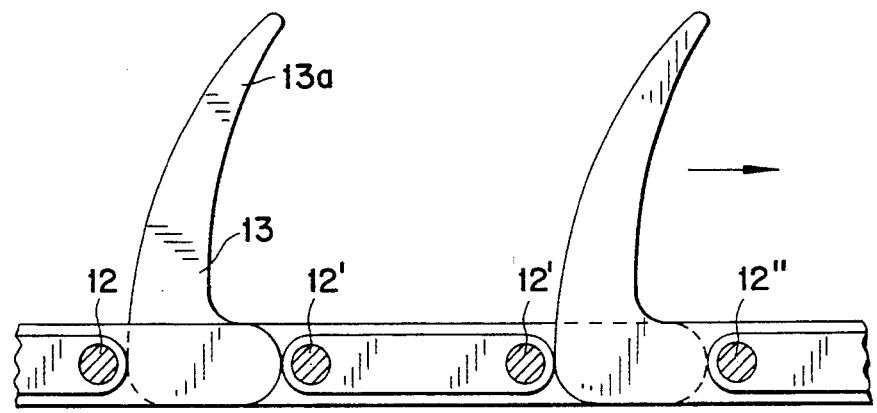

FIG. 3 a section along the line III—III in FIG. 2

Figure 4:
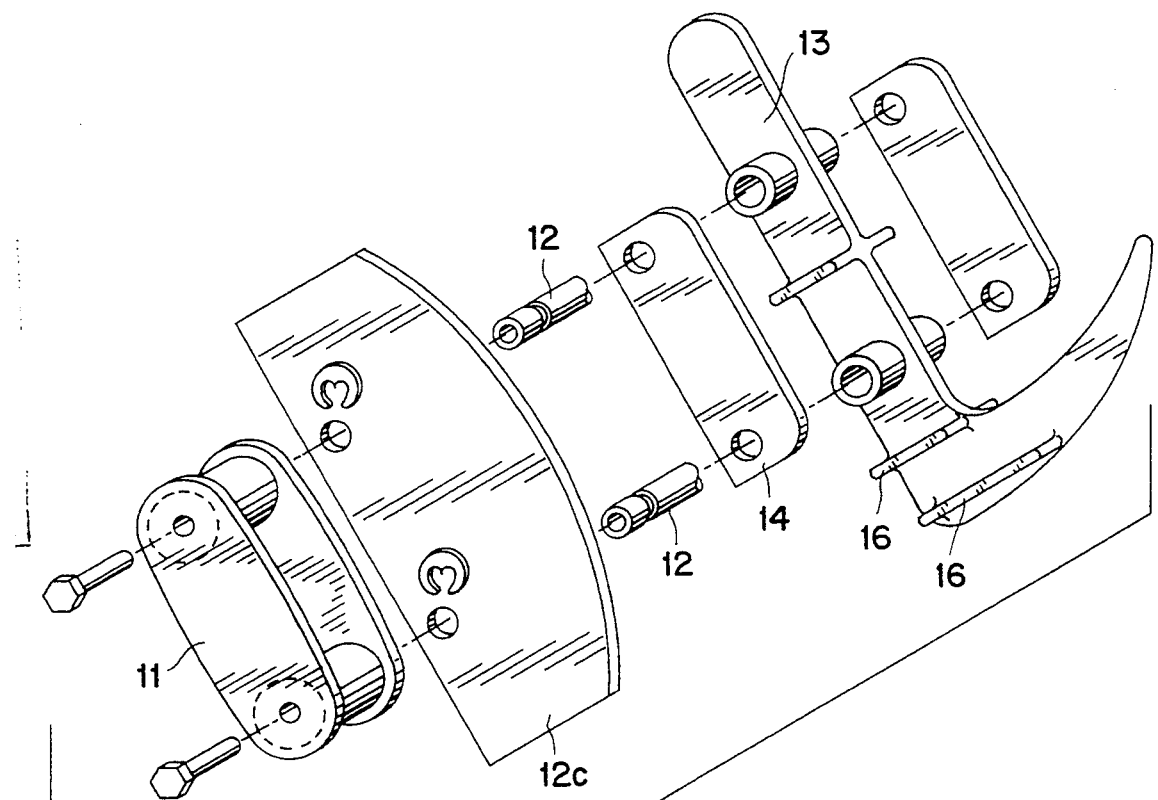

FIG. 4 part of the sieve belt of the sieve rake of FIG. 1, in exploded view

Figure 5:
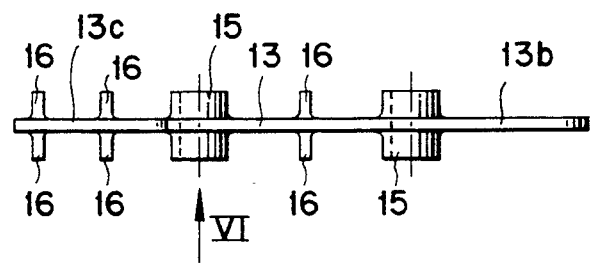

FIG. 5 a top view of a single sieve member

Figure 6:
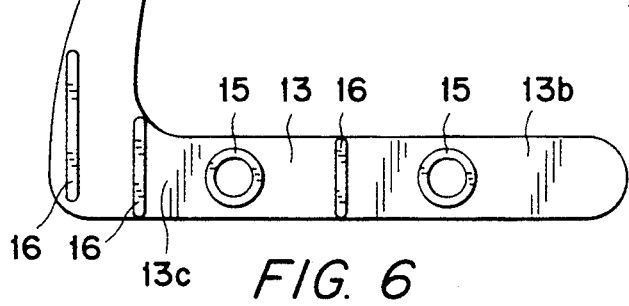

FIG. 6 the sieve member of FIG. 5 in a side view in direction of arrow VI

Figure 7:
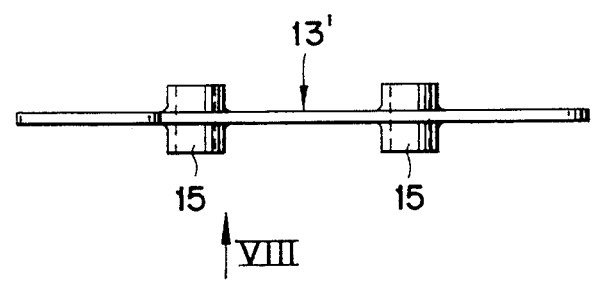

FIG. 7 a modified sieve member in a top view like that of FIG. 5

Figure 8:
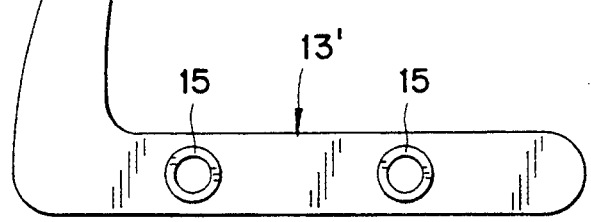

FIG. 8 view in direction of VIII of the sieve member of FIG. 7

The sieve rake shown in FIG. 1 serves to remove solid matter, particularly larger bodies, from a waste water current running in a waste water channel 1. The direction of flow is indicated by arrow 2. The lower portion of the sieve rake protrudes into the waste water flow and runs upward and diagonally above the channel 1.

The sieve rake exhibits a continuously circulating sieve belt 5 that runs in the direction of arrow 4 and is guided by a lower deflection roller 6 and an upper deflection roller 7, which are driven by a belt drive 3.

The solid mater ejected at the head of the sieve belt 5 falls onto a conveyor apparatus 8 indicated only in simplified form in the drawing. Ejection of the solid mater is supported by a driven rotary brush 9 and, when necessary, by a spraying apparatus 10.

As can be seen from the details of FIGS. 2 and 4, the sieve belt 5 exhibits two lateral link chains 11 which run over the deflector rollers 6 and 7. Extending an regular intervals between the two link chains 11 are support rods 12 which with their ends also form the bolts of the link chains 5.

Positioned on the support rods 12 and immediately beside the lateral link chains 5 are flat lateral bordering elements 13 which together form a lateral border on both longitudinal sides of the sieve belt 5.

The support rods 12 support several sieve members 12c, between which separating elements are positioned. For the sake of easy identification, FIG. 2 shows one of the sieve members 13 in highlighted form.

As can be seen in FIG. 2, each group of several sieve members 13 provided with hooks 13a and with interposed separating members 14 is supported by two support rods 12. The adjacent group of sieve members 13 in turn are independently supported by two support rods 12′ provided exclusively for this purpose. The next group of sieve members 13 is again supported independently by two corresponding support rods 12″. This configuration assures that each group of adjacent sieve members is supported independent of the preceding and succeeding group of sieve members 13 on two separate supports 12, 12′, 12″, etc.

Consequently it is always possible to completely remove a group of sieve members 13 that are positioned side by side, independent of and unaffected by the adjacent sieve members, and to replace them. The damaged sieve members do not have to be replaced immediately. In the interim it is sufficient to reinsert the support rods 12 or to employ separate chain bolts for the link chains 5.

To completely cover the intermediate space between adjacent groups of sieve members, sieve members 13 are designed so that in each group, both in the belt's direction of travel and in the opposite direction, the sieve members exhibit extensions 13b and 13c that project from the two corresponding support rods 12, 12′, 12″. The extensions 13b, projecting forward in the belt's direction of travel, of one group and those extensions, projecting opposite the belt's direction of travel and provided with hooks 13a, of the adjacent group interlock in a comb-like fashion.

The sieve members 13 consist of flat material which rests on a plane that runs vertical to the support rods 12. To provide a secure mounting on the support rods 12 and to maintain the giving spacing from the adjacent sieve member, the sieve members 13 each have two mounting bushings 15 positioned on the two support rods 12; in the depicted embodiment these bushing extend to either side beyond the flat material of the sieve member 13.

In the example depicted in FIGS. 1 to 6, the sieve members 13 support lateral sieve ribs 16 on their middle section located between the two support rods 12 and on the member extension 13c; these ribs divide the intermediate spaces between adjacent sieve members 13 in order to provide a sieve with a narrow mesh. Deviating from the depicted embodiment, the lateral sieve ribs 16 can also be provided on the front extension 13b and can be omitted on the rear extension 13c.

In the modified embodiment of the sieve members 13′ shown in FIGS. 7 and 8, these lateral sieve ribs 16 have been omitted. This simpler design is sufficient when a larger sieve width is permissible or when the sieve width can be kept small enough by a narrow positioning of the adjacent sieve members.

We claim:

1. Sieve rake for the removal of solid matter from a waste water current, with a driven sieve belt positioned in the waste water, which sieve belt comprises two lateral link chains between which run a plurality of support rods which support groups of sieve members which are provided with hooks for capturing solid matter and are positioned one beside the other forming interstices through which the waste water flows, wherein each group of sieve members is positioned on two support rods independent of the preceding and succeeding group of sieve members, and whereas the sieve members (13) of each group comprises extensions which extend beyond the two corresponding support rods in the belt's direction of travel and opposite thereto, and intermeshing with the member extensions of the preceding and succeeding groups of sieve members.

2. Sieve rake as defined in claim 1, wherein the rear extensions that run opposite to the belt's direction of motion each support said hook, which projects from the belt plane.

3. Sieve rake as defined in claim 1, wherein the sieve members comprise flat material that rests on a plane running perpendicular to the support rods.

4. Sieve rake as defined in claim 3, wherein the sieve members each comprise two bushings mounted on the two support rods.

5. Sieve rake as defined in claim 1, wherein the sieve members comprise lateral sieve ribs on the central section lying between the support rods and on at least one of the two extensions.

* * * * *